United States Patent
Maeda et al.

(10) Patent No.: US 12,166,221 B2
(45) Date of Patent: Dec. 10, 2024

(54) ENERGY STORAGE DEVICE HAVING A GAP BETWEEN AN ELECTRODE TERMINAL AND AN INSULATING MEMBER

(71) Applicant: GS Yuasa International Ltd., Kyoto (JP)

(72) Inventors: Kazuto Maeda, Kyoto (JP); Shohei Yamao, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 465 days.

(21) Appl. No.: 16/964,123

(22) PCT Filed: Jan. 30, 2019

(86) PCT No.: PCT/JP2019/003264
§ 371 (c)(1),
(2) Date: Jul. 22, 2020

(87) PCT Pub. No.: WO2019/151359
PCT Pub. Date: Aug. 8, 2019

(65) Prior Publication Data
US 2021/0036299 A1 Feb. 4, 2021

(30) Foreign Application Priority Data
Jan. 31, 2018 (JP) .................................. 2018-014774

(51) Int. Cl.
*H01M 50/188* (2021.01)
*H01M 50/176* (2021.01)
(Continued)

(52) U.S. Cl.
CPC ....... *H01M 50/188* (2021.01); *H01M 50/176* (2021.01); *H01M 50/193* (2021.01); *H01M 50/55* (2021.01); *H01M 50/553* (2021.01)

(58) Field of Classification Search
CPC ............. H01M 50/543; H01M 50/172; H01M 50/188; H01M 50/553; H01G 11/80
See application file for complete search history.

(56) References Cited

U.S. PATENT DOCUMENTS

2012/0214030 A1   8/2012   Guen
2015/0180008 A1   6/2015   Lee et al.
(Continued)

FOREIGN PATENT DOCUMENTS

EP   2 887 429 A1   6/2015
JP   2012-174683 A   9/2012
(Continued)

OTHER PUBLICATIONS

English translation of Egawa et al. (JP-2016091720-A). (Year: 2016).*

(Continued)

*Primary Examiner* — Jonathan G Leong
*Assistant Examiner* — Drew C Newman
(74) *Attorney, Agent, or Firm* — MCGINN I.P. LAW GROUP, PLLC

(57) ABSTRACT

An energy storage device includes: a case; an electrode terminal having a terminal body, a shaft, and a step disposed at the root of the shaft; and an upper insulating member disposed between the terminal body and the case. The upper insulating member has a terminal support part abutting on a terminal bottom surface of the step and a wall part facing the end face of the terminal body. On one of the terminal body and the upper insulating member, a convex part projecting toward the other of the terminal body and the upper insulating member is formed at a position between the step and the wall part. A gap is formed between the terminal body and the upper insulating member on the side of the convex part.

19 Claims, 6 Drawing Sheets

(51) Int. Cl.
H01M 50/193 (2021.01)
H01M 50/55 (2021.01)
H01M 50/553 (2021.01)

(56) References Cited

U.S. PATENT DOCUMENTS

2016/0254517 A1 9/2016 Tsunaki et al.
2017/0214030 A1 7/2017 Tsutsumi et al.
2017/0237049 A1 8/2017 Yoneda

FOREIGN PATENT DOCUMENTS

| | | | |
|---|---|---|---|
| JP | 2013-033661 A | | 2/2013 |
| JP | 2015-097174 A | | 5/2015 |
| JP | 2016091720 A | * | 5/2016 |
| JP | 2016-122604 A | | 7/2016 |
| JP | 2016-207433 A | | 12/2016 |
| JP | 2016207510 A | * | 12/2016 |
| JP | 2017-120744 A | | 7/2017 |
| JP | 2017-130386 A | | 7/2017 |
| JP | 2017-147080 A | | 8/2017 |
| WO | WO 2015/059826 A1 | | 4/2015 |
| WO | WO 2017/090706 A1 | | 6/2017 |
| WO | WO-2017115859 A1 | * | 7/2017 |

OTHER PUBLICATIONS

International Search Report (ISR) (PCT Form PCT/ISA/210), in PCT/JP2019/003264, dated Apr. 23, 2019.

* cited by examiner

ENERGY STORAGE DEVICE HAVING A GAP BETWEEN AN ELECTRODE TERMINAL AND AN INSULATING MEMBER

TECHNICAL FIELD

The present invention relates to an energy storage device including an insulating member disposed between a terminal body of an electrode terminal and a case.

BACKGROUND ART

Conventionally, an energy storage device including a case for storing an electrode assembly and an electrode terminal disposed in the case is known widely. For example, Patent Document 1 discloses an energy storage device including an external gasket disposed between a head part of an external terminal and a case. In this energy storage device, the external terminal has a first convex part surrounding a shaft part, and the external gasket has a second convex part at a position corresponding to the first convex part. The second convex part is crushed by a pressing force from the first convex part of the terminal head, thereby ensuring sufficient sealability between the external terminal and the case.

PRIOR ART DOCUMENT

Patent Document

Patent Document 1: JP-A-2017-130386

SUMMARY OF THE INVENTION

Problems to be Solved by the Invention

There are various requirements for electrode terminals and insulating members, and it is not easy to determine how the electrode terminals and insulating members are to be configured to meet these requirements.

An object of the present invention is to provide an energy storage device including an insulating member disposed between a terminal body of an electrode terminal and a case, as well as an energy storage device having high reliability.

Means for Solving the Problems

An energy storage device according to one aspect of the present invention is an energy storage device including: a case, an electrode terminal that has a plate-shaped terminal body, a shaft extended in a predetermined direction from the terminal body, and a step disposed at a root of the shaft; and an insulating member disposed between the terminal body and the case. The insulating member has a terminal support part abutting on a terminal bottom surface of the step, the terminal bottom surface being a surface in the predetermined direction, and a wall part facing an end face of the terminal body. On one of the terminal body and the insulating member, a convex part projecting toward an other of the terminal body and the insulating member is formed at a position between the step and the wall part. A gap is formed on a side of the convex part between the terminal body and the insulating member when viewed from the projecting direction of the convex part.

Advantages of the Invention

According to the present invention, it is possible to provide an energy storage device including an insulating member disposed between a terminal body of an electrode terminal and a case, as well as an energy storage device having high reliability.

MODE FOR CARRYING OUT THE INVENTION

Figure 1:
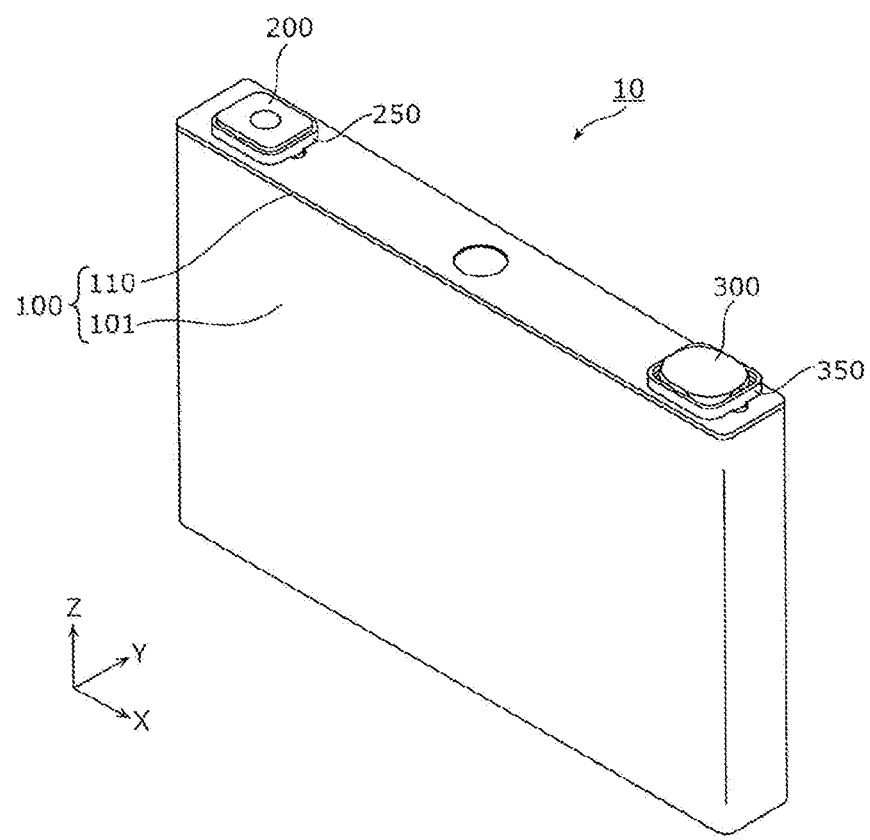
FIG. 1 is a perspective view illustrating an appearance of an energy storage device according to an embodiment.

The present inventors have found that the following problems arise with respect to the energy storage device in Patent Document 1. The insulating member interposed between the electrode terminal and the case, such as the external gasket disclosed in Patent Document 1, is generally made of a resin such as polypropylene (PP). For this reason, when a bus bar is welded to the terminal body of the electrode terminal, the heat of the welding is conducted to the terminal body, and this may cause a failure such as deformation of the insulating member. The deformation of the insulating member becomes a factor of lowering the reliability of the energy storage device, such as lowering of airtightness.

More specifically, when the bus bar and the terminal body are to be welded, there is preferably no gap between the terminal body and the bus bar from the viewpoint of improving the welding quality. Therefore, when the welding is performed, the bus bar is pressed toward the terminal body. The terminal body is thus pressed toward the insulating member, and the welding is performed in this state. That is, the welding is performed in a state where the heat is easily conducted from the terminal body to the insulating member.

In order to prevent such heat conduction, it is conceivable to increase the thickness of the terminal body. However, in this instance, the height of the case needs to be reduced in order to maintain the height of the energy storage device, and as a result, the energy density decreases. An increase in manufacturing cost due to an increase in the material required for preparing the electrode terminal or an increase in weight of the energy storage device also occurs. Further, at the time of welding or after welding between the bus bar and the terminal body, a force in the direction of rotation about the shaft may act on the terminal body, and the insulating member is expected to also serve as a detent for the terminal body. As described above, there are various requirements for electrode terminals and insulating members, and it is not easy to determine how the electrode terminals and insulating members are to be configured to meet these requirements.

An energy storage device according to one aspect of the present invention is an energy storage device including: a case, an electrode terminal that has a plate-shaped terminal body, a shaft extended in a predetermined direction from the terminal body, and a step disposed at a root of the shaft; and an insulating member disposed between the terminal body and the case. The insulating member has a terminal support part abutting on a terminal bottom surface of the step, the terminal bottom surface being a surface in the predetermined direction, and a wall part facing an end face of the terminal body. On one of the terminal body and the insulating member, a convex part projecting toward an other of the terminal body and the insulating member is formed at a position between the step and the wall part. A gap is formed on a side of the convex part between the terminal body and the insulating member when viewed from the projecting direction of the convex part.

With this configuration, the terminal body is supported by the terminal support part of the insulating member, and a gap is formed on the side of the convex part between the terminal body and the insulating member. Hence the heat conduction from the terminal body to the insulating member is prevented while the terminal body is fixed stably. Therefore, the occurrence of a failure of the insulating member due to the heat at the time of the welding of the bus bar or the like is prevented.

As described above, the energy storage device in the present aspect is an energy storage device including the insulating member disposed between the terminal body of the electrode terminal and the case, as well as an energy storage device having high reliability.

The convex part may be provided in the insulating member.

With this configuration, when the terminal body is pressed at the time of joining with the bus bar or the like, since the insulating member has the convex part, the convex part absorbs a pressing force, thereby preventing damage to portions except for the convex part of the insulating member.

A plurality of the convex parts may be disposed dispersedly when viewed from the predetermined direction.

With this configuration, since the plurality of convex parts for separating the terminal body and the insulating member are disposed dispersedly, for example, the support of the terminal body by the insulating member can be stabilized.

The gap may be formed in a region between the convex part and the step when viewed from the predetermined direction.

With this configuration, in the electrode terminal, the convex part is at a position away from the step, which is a portion supported by the insulating member, so that the terminal body can be supported more stably. Since the existence range of the gap when viewed from the predetermined direction is relatively wide, a bonding region (a region suitable for joining by laser welding or the like) in the terminal body is relatively wide.

The convex part may be integrally provided with the wall part.

With this configuration, since the convex part is integrated with the wall part, the rigidity of the convex part is improved as compared to when the convex part exists apart from the wall part, and thus the possibility of crushing the convex part at the time of joining the bus bar or the like is reduced even when a relatively large pressing force is applied to the terminal body. As a result, the formation of a gap between the terminal body and the insulating member is ensured.

The case may be provided with a recess that is provided at a position corresponding to the step, the recess being formed in a state where a part of the case is swollen toward the inside of the case.

With this configuration, the recess functions as a location for reinforcing the portion corresponding to the step of the case, and hence the deformation of the portion of the case is prevented when processing such as caulking is performed on the shaft or when the terminal body and the bus bar are joined.

Hereinafter, energy storage devices according to an embodiment and a modification of the present invention will be described with reference to the drawings. Each of the drawings is a schematic diagram, and is not necessarily illustrated strictly.

Each of the embodiments and modifications described below shows a specific example of the present invention. Shapes, materials, components, placement positions and connection forms of the components, sequences of manufacturing steps, and the like shown in the following embodiment and modification are only examples and are not intended to limit the present invention. Among the components in the following embodiment and modification, components not described in the independent claim indicating the highest concept will be described as optional components.

In the descriptions and drawings in the embodiment and the modification, the arrangement direction of a pair of electrode terminals of the energy storage device, the arrangement direction of a pair of current collectors, the arrangement direction of both ends of an electrode assembly (a pair of composite material layer non-forming parts), the winding-axis direction of the electrode assembly, or the facing direction of the short side surface of a case is defined as the X-axis direction. The facing direction of the long side surface of the case, the short direction of the short side surface of the case, or the thickness direction of the case is defined as the Y-axis direction. The arrangement direction if a case body and a lid plate of the energy storage device, the longitudinal direction of the short side surface of the case, the extension direction of the legs of the current collector, or the vertical direction is defined as the Z-axis direction. The X-axis direction, Y-axis direction, and Z-axis direction are mutually intersecting (orthogonal in the present embodiment) directions. It is conceivable that the Z-axis direction may not be the vertical direction depending on the use aspect, but for convenience of description, a description will be given below with the Z-axis direction as the vertical direction. In the following description, for example, the X-axis plus side indicates the arrow direction side of the X-axis, and the X-axis minus side indicates the opposite side to the X-axis plus side. The same applies to the Y-axis direction and the Z-axis direction.

Embodiment

1 General Description of Energy Storage Device

Figure 2:
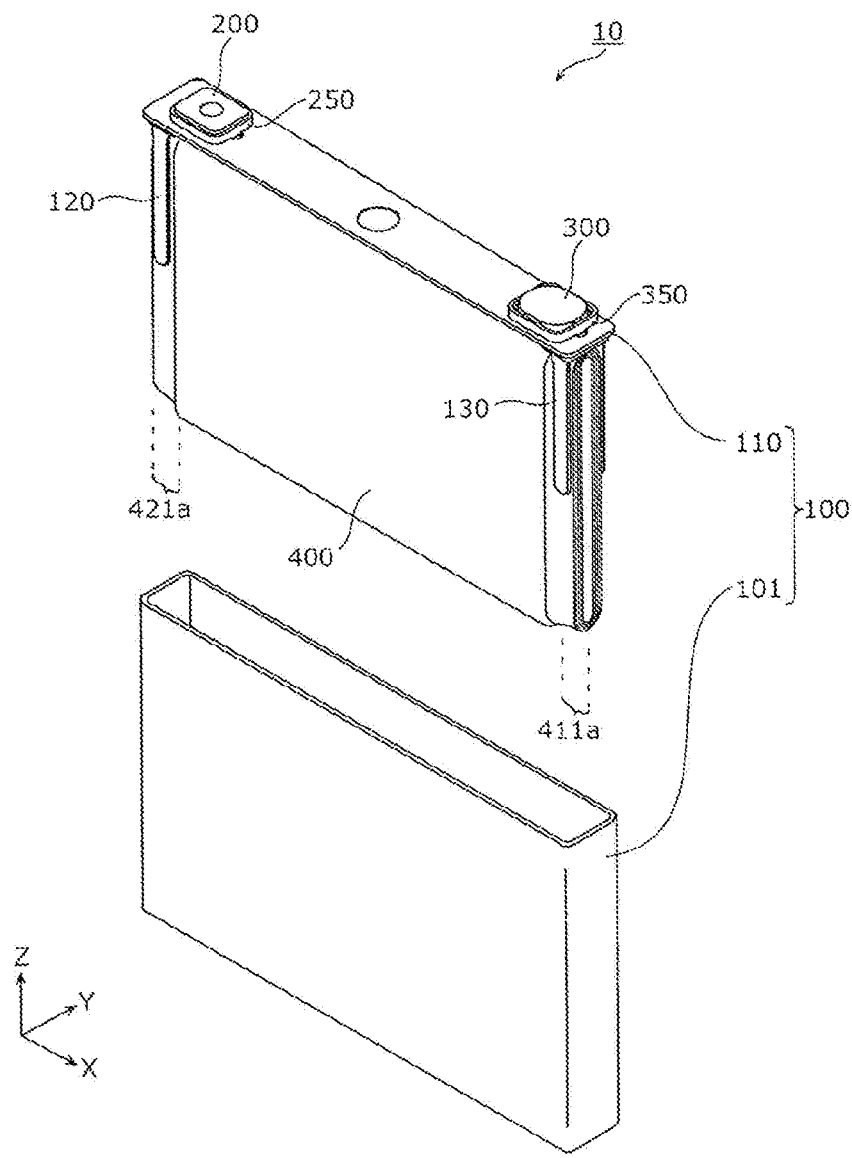
FIG. 2 is a perspective view illustrating components that are disposed in a case of the energy storage device according to the embodiment.

First, a general description of an energy storage device 10 according to the embodiment will be given with reference to FIGS. 1 and 2. FIG. 1 is a perspective view illustrating the appearance of the energy storage device 10 according to the embodiment. FIG. 2 is a perspective view illustrating components that are disposed in a case 100 of the energy storage device 10 according to the embodiment. More specifically, FIG. 2 is a perspective view illustrating the energy storage device 10 by separating a lid plate 110 and a case body 101 of the case 100.

The energy storage device 10 is a secondary battery that can charge and discharge electricity and is more specifically a nonaqueous electrolyte secondary battery such as a lithium ion secondary battery. The energy storage device 10 is applied to a power source for an automobile (or a mobile body) such as an electric vehicle (EV), a hybrid electric vehicle (HEV), or a plug-in hybrid electric vehicle (PHEV), a power source for electronic devices, a power storage power source, or the like. The energy storage device 10 is not limited to a nonaqueous electrolyte secondary battery but may be a secondary battery other than the nonaqueous electrolyte secondary battery or may be a capacitor. The energy storage device 10 may be a primary battery that can use stored electricity without being charged by the user. The energy storage device 10 may be a battery using a solid electrolyte.

As illustrated in FIG. 1, the energy storage device 10 includes the case 100, an electrode terminal 200 on the negative electrode side, and an electrode terminal 300 on the positive electrode side. As illustrated in FIG. 2, a current collector 120 on the negative electrode side, a current collector 130 on the positive electrode side, and an electrode assembly 400 are housed inside the case 100.

In addition to the above components, the energy storage device 10 may include a spacer disposed on the side of the current collectors 120, 130, an insulating film for enclosing the electrode assembly 400, and the like, and some other component. An electrolyte solution (nonaqueous electrolyte solution) and the like are enclosed inside the case 100 of the energy storage device 10, but the illustration thereof is omitted. The electrolyte solution to be enclosed in the case 100 is not particularly limited in its type so long as not impairing the performance of the energy storage device 10, and various electrolyte solutions can be selected.

The case 100 is made up of the case body 101 having a rectangular cylindrical shape and including a bottom, and the lid plate 110 that is a plate-like member for closing the opening of the case body 101. The case 100 has a structure for sealing the inside by housing the electrode assembly 400 and the like inside and then welding or the like between the lid plate 110 and the case body 101. The material of the lid plate 110 and the case body 101 is not particularly limited but is preferably a weldable metal such as stainless steel, aluminum, or an aluminum alloy.

The electrode assembly 400 includes a positive electrode plate, a negative electrode plate, and a separator and is an energy storage element (power generating element) that can store electricity. The positive electrode plate is an electrode plate in which a composite material layer containing a positive active material is formed on a positive electrode substrate layer that is a long strip current collecting foil made of aluminum or an aluminum alloy. The negative electrode plate is an electrode plate in which a composite material layer containing a negative active material is formed on a negative electrode substrate layer that is a long strip current collecting foil made of copper or a copper alloy. The separator is a microporous sheet made of resin or the like. The electrode assembly 400 is formed by disposing and winding the separator between the positive electrode plate and the negative electrode plate.

The electrode assembly 400 has a positive-electrode-side end 411a formed by laminating substrate layers of the positive electrode plate on one end (the end on the X-axis-direction plus side in FIG. 2) in the winding-axis direction (the X-axis direction in the present embodiment). The electrode assembly 400 has a negative-electrode-side end 421a formed by laminating substrate layers of the negative electrode plate on the other end (the end on the X-axis minus side in FIG. 2) in the winding-axis direction. The positive-electrode-side end 411a is joined to the current collector 130, and the negative-electrode-side end 421a is joined to the current collector 120.

In the present embodiment, an elliptical shape is illustrated as the cross-sectional shape of the electrode assembly 400, but an elliptic type, a circular shape, a polygonal shape, or the like may be used. The shape of the electrode assembly 400 is not limited to the winding type but may be a laminated type in which flat electrode plates are laminated or a bellows type in which the electrode plates are folded in a bellows shape.

The electrode terminal 200, which is a negative electrode terminal, is electrically connected to the negative electrode of the electrode assembly 400 through the current collector 120. The electrode terminal 300, which is a positive electrode terminal, is electrically connected to the positive electrode of the electrode assembly 400 through the current collector 130. The electrode terminals 200, 300 are attached to the lid plate 110 disposed above the electrode assembly 400 through upper insulating members 250, 350.

The current collectors 120, 130 are members having conductivity and rigidity, the members being disposed between the electrode assembly 400 and the wall surface of the case 100 and electrically connected to the electrode terminals 200, 300 and the negative electrode plate and the positive electrode plate of the electrode assembly 400. The material of the current collector 130 is not limited but is formed of, for example, aluminum or an aluminum alloy similarly to the positive electrode substrate layer of the electrode assembly 400. Also, the material of the current collector 120 is not limited but is formed of, for example, copper or a copper alloy, similarly to the negative electrode substrate layer of the electrode assembly 400.

2. Structure for Attachment of Electrode Terminal to Case

Next, a structure for attachment of the electrode terminals to the lid plate 110 in the energy storage device 10 according to the present embodiment will be described with reference to FIGS. 3 to 6. In the present embodiment, the structure for attachment to the lid plate 110 is common between the electrode terminals 200, 300. Therefore, the structure for attachment of the electrode terminal 300 on the positive electrode side to the lid plate 110 will be described below. The illustration and description of the structure for attachment of the electrode terminal 200 on the negative electrode side to the lid plate 110 are omitted.

Figure 3:
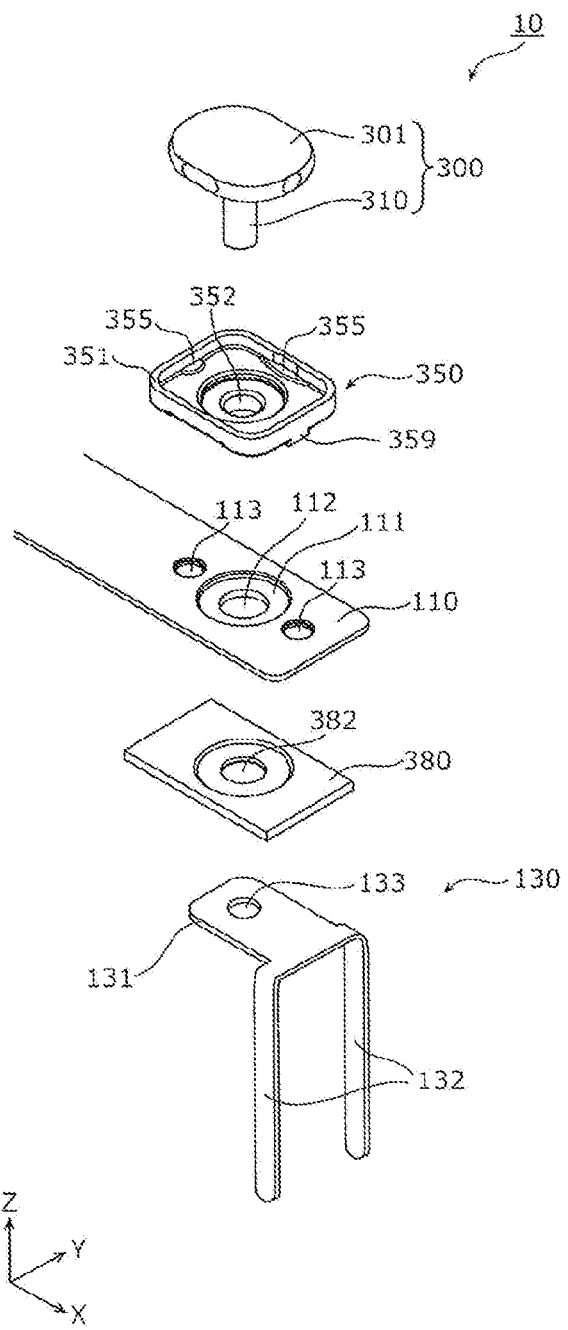
FIG. 3 is an exploded perspective view illustrating a structure for attachment of an electrode terminal to a lid plate according to the embodiment.
Figure 4:
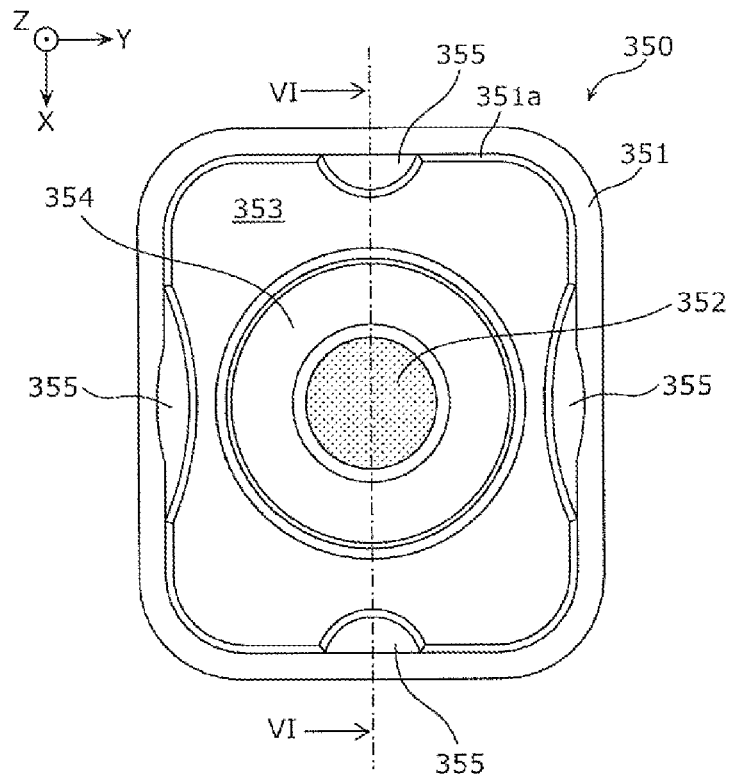
FIG. 4 is a plan view illustrating an outline of the structure of the upper insulating member according to the embodiment.

FIG. 3 is an exploded perspective view illustrating the structure for attachment of the electrode terminal 300 to the lid plate 110 according to the embodiment. In FIG. 3, a shaft 310 is illustrated in a state before being caulked. FIG. 4 is a plan view illustrating the outline of the structure of the upper insulating member 350 according to the embodiment. In FIG. 4, an opening 352 penetrating an upper insulating member 350 is represented by a region marked with dots so as to be easily distinguished from the other elements.

Figure 5:
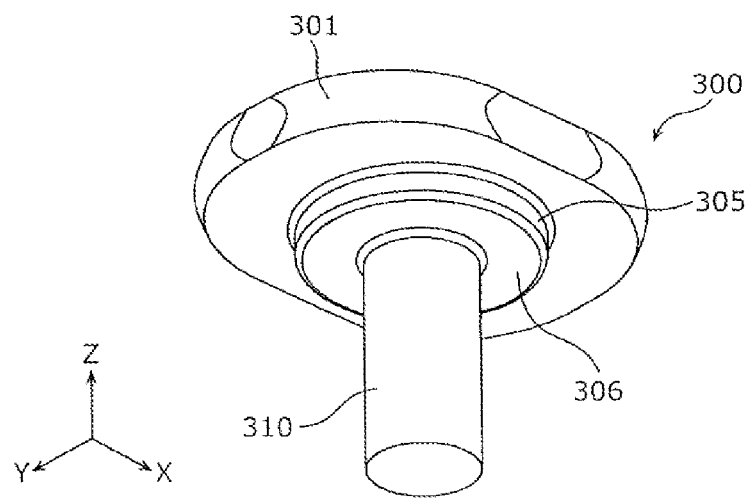
FIG. 5 is a perspective view illustrating a configuration of an electrode terminal according to the embodiment.
Figure 6:
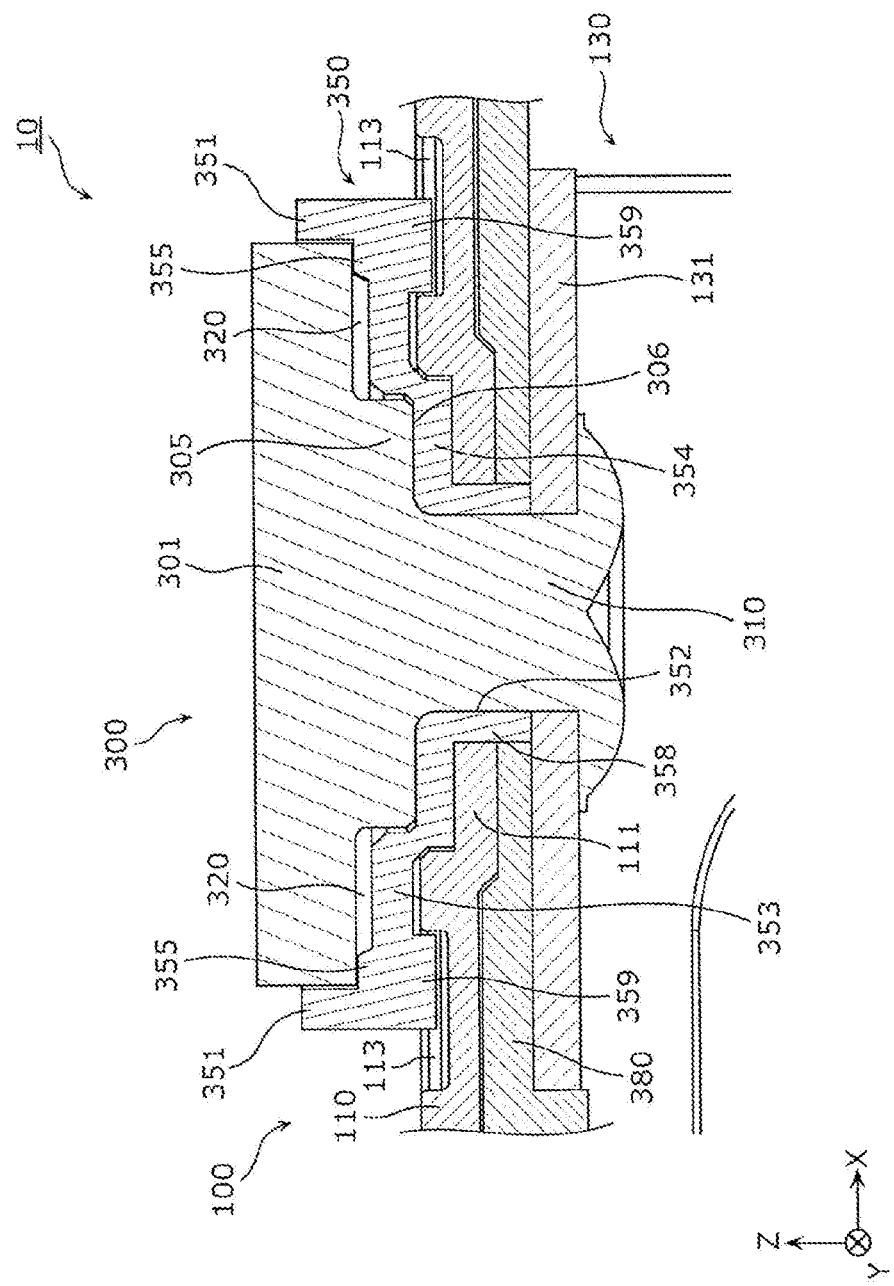
FIG. 6 is a partial cross-sectional view of the energy storage device according to the embodiment.

FIG. 5 is a perspective view illustrating the configuration of the electrode terminal 300 according to the embodiment. FIG. 6 is a partial cross-sectional view of the energy storage device 10 according to the embodiment. Specifically, FIG. 6 illustrates a cross-section of the upper insulating member 350 and its periphery when the energy storage device 10 is cut in the XZ plane passing a line VI-VI shown in FIG. 4.

As illustrated in FIGS. 3 and 5, in the present embodiment, the electrode terminal 300 has a terminal body 301, a shaft 310, and a step 305. The shaft 310 extends in a predetermined direction (the direction on the Z-axis minus side in the present embodiment) from the terminal body 301, and the step 305 is formed at the root of the shaft 310 so as to surround the periphery of the shaft 310. The terminal body 301 is disposed on the lid plate 110 of the case 100 through the upper insulating member 350 and is electrically connected to the current collector 130 in the case 100 through the shaft 310.

More specifically, as illustrated in FIGS. 3 and 6, the shaft 310 provided in the electrode terminal 300 is inserted into the opening 352 of the upper insulating member 350, an opening 112 of the lid plate 110, an opening 382 of a lower insulating member 380, and an opening 133 of the current collector 130, and the tip of the shaft 310 is caulked. Thereby, the electrode terminal 300 is fixed to the lid plate 110 together with the upper insulating member 350, the lower insulating member 380, and the current collector 130.

The current collector 130 has a terminal connection 131 having the opening 133 formed therein, and a pair of legs 132 extending from the terminal connection 131, and the pair of legs 132 are joined to the positive-electrode-side end 411a of the electrode assembly 400 as described above.

As described above, in the present embodiment, the tip of the shaft 310 connected to the electrode terminal 300 is caulked, whereby the electrode terminal 300 and the current collector 130 are electrically and mechanically connected, and these members, the upper insulating member 350, and the lower insulating member 380 are fixed to the lid plate 110.

In the present embodiment, the upper insulating member 350 disposed between the lid plate 110 and the electrode terminal 300 has a cylindrical portion 358 (cf. FIG. 6) forming an opening 352 through which the shaft 310 penetrates. The cylindrical portion 358 serves to maintain airtightness between the shaft 310 and the opening 112 of the lid plate 110. That is, the upper insulating member 350 also functions as a so-called gasket. Each of the upper insulating member 350 and the lower insulating member 380 is formed of an insulating material such as polypropylene (PP), polyethylene (PE), polyphenylene sulfide resin (PPS), polyether ether ketone (PEEK), tetrafluoroethylene perfluoroalkyl vinyl ether (PFA), polytetrafluoroethylene (PTFE), polybutylene terephthalate (PBT), or poly ether sulfone (PES).

As illustrated in FIG. 3, the upper insulating member 350 has a projection 359 that engages with an engagement recess 113 provided in the lid plate 110. By being engaged with the projection 359, the engagement recess 113 functions as a detent for the upper insulating member 350.

In the present embodiment, the terminal body 301 is a member that is joined to, for example, a bus bar to input and output electric energy through the bus bar. As a method of joining the terminal body 301 and the bus bar, for example, laser welding is used.

When a bus bar and a terminal body 301 are joined by laser welding, the heat generated by welding is conducted from the terminal body 301 to an upper insulating member 350 that supports the terminal body 301. When this heat becomes excessive, there is a possibility that the upper insulating member 350 is damaged by the heat. It is thus preferable that a gap for forming an air layer exist between the terminal body 301 and the upper insulating member 350 from the viewpoint of preventing heat conduction from the terminal body 301 to the upper insulating member 350. However, from the viewpoint of improving the welding quality between the bus bar and the terminal body 301, the terminal body 301 is preferably firmly supported by the upper insulating member 350.

Therefore, in the present embodiment, a structure is adopted in which the terminal body 301 is supported mainly at the position of the step 305, and the gap 320 is formed between the upper insulating member 350 and the terminal body 301 by the convex part provided between the upper insulating member 350 and the terminal body 301.

Specifically, a terminal bottom surface 306 (cf. FIG. 5), which is the surface of the step 305 of the electrode terminal 300 on the upper insulating member 350 side, functions as the surface supported by the upper insulating member 350. More specifically, as illustrated in FIGS. 4 and 6, the upper insulating member 350 has a terminal support part 354 that abuts on the terminal bottom surface 306. That is, the upper insulating member 350 is formed with a recess that surrounds the opening 352 and has a size corresponding to the step 305, and the bottom surface of the recess functions as the terminal support part 354 on which the terminal bottom surface 306 abuts.

A convex part for separating the terminal body 301 from the upper insulating member 350 exists between the terminal body 301 and the upper insulating member 350. In the present embodiment, a convex part 355 provided on the upper insulating member 350 supports the terminal body 301 to form a gap 320 on the side of the convex part 355.

Further, the upper insulating member 350 has a wall part 351 facing the end face of the terminal body 301. In the present embodiment, the wall part 351 is a wall erected at the outer peripheral edge of an insulating body 353 which is the body of the upper insulating member 350, and is formed so as to cover the periphery of the terminal body 301 in a plan view (when viewed from the Z-axis direction). As described above, the upper insulating member 350 is prevented from rotating by the projection 359 engaging with the engagement recess 113 of the case 100, and the wall part 351 functions as a detent for the terminal body 301 (electrode terminal 300).

Thus, the energy storage device 10 according to the present embodiment includes: the case 100; the electrode terminal 300 that has the plate-shaped terminal body 301, the shaft 310 extended in the predetermined direction (the direction on the Z-axis minus side in the present embodiment) from the terminal body 301, and the step 305 disposed at the root of the shaft 310; and the upper insulating member 350 disposed between the terminal body 301 and the case 100. The upper insulating member 350 has the terminal support part 354 abutting on the terminal bottom surface 306 of the step 305 which is the surface on the predetermined direction side, and the wall part 351 facing the end face of the terminal body 301. On one of the terminal body 301 and the upper insulating member 350, convex part 355 projecting toward the other of the terminal body 301 and the upper insulating member 350 is formed between the step 305 and the wall part 351. The gap 320 is formed between the terminal body 301 and the upper insulating member 350 on the side of the convex part 355 when viewed from a predetermined direction. In the present embodiment, the convex part 355 is provided on the upper insulating member 350.

That is, in the energy storage device 10 according to the present embodiment, the terminal body 301 is supported by the terminal support part 354 of the upper insulating member 350, and the gap 320 is formed on the side of the convex part 355 between the terminal body 301 and the upper insulating member 350. Thus, heat conduction from the terminal body 301 to the upper insulating member 350 is prevented while the terminal body 301 is fixed stably. Therefore, the occurrence of a failure of the upper insulating member 350 due to heat at the time of the welding of the bus bar or the like is prevented. For example, even when a pressing force is applied to the terminal body 301 in the operation of joining the bus bar and the terminal body 301, since the terminal body 301 is supported at least at two points of the convex part 355 and the terminal support part 354, the joining operation can be performed with high accuracy. Hence the reliability of the junction is ensured. The deformation of the terminal body 301 at the time of joining is prevented.

With the terminal body 301 having the step 305, the distance from the welded surface of the terminal body 301 with the bus bar (the surface on the Z-axis plus side) to the portion where the upper insulating member 350 is in contact with the shaft 310 becomes longer than when the step 305 is not provided. Thereby, the heat generated at the time of welding the bus bar and the terminal body 301 is hardly conducted to the portion (airtight portion) where the airtight state is maintained by the upper insulating member 350. Therefore, damage to the airtight portion of the upper insulating member 350 due to the heat is prevented.

Since the step 305 is a portion for increasing the thickness (width in the Z-axis direction) of the terminal body 301, the strength of the terminal body 301 is improved. This reduces the possibility that the terminal body 301 is deformed or damaged at the time of joining the bus bar to the terminal body 301.

In order to reduce the amount of heat conducted to the upper insulating member 350 at the time of welding the bus bar and the terminal body 301, it is preferable to join the bus bar within the range where the gap 320 exists in a top view (when viewed from the Z-axis plus side). That is, it is preferable that the gap 320 and at least a part of the welded region of the terminal body 301 and the bus bar overlap each other in the top view, and it is more preferable that the most part of the welded region and the gap 320 overlap each other in the top view. It is even more preferable that the entire region of the welding region and the gap 320 overlap each other in the top view. In other words, the gap 320 preferably exists in a position where a region in which the welding region and the gap 320 overlap each other becomes as large as possible in the top view. In the present embodiment, the region where the gap 320 exists is, for example, a region outside the terminal support part 354 and inside the wall part 351 and the four convex parts 355 in FIG. 4.

Further, the wall part 351 of the upper insulating member 350 exists at a position facing the end face of the terminal body 301 and thus functions as a detent for the terminal body 301 (electrode terminal 300).

The upper insulating member 350 is a member obtained, for example, by molding a resin such as PP using a mold, and the wall part 351 is provided on the upper insulating member 350 as a location erected from the insulating body 353. Hence it is difficult to completely eliminate the existence of a bent (R part 351a, cf. FIG. 4) at the root of the wall part 351 in terms of manufacturing. When the R part 351a is at the root of the wall part 351 and the terminal body 301 is to be disposed in the state of surface contact with the insulating body 353, the corner of the terminal body 301 comes into contact with the R part 351a, which makes it difficult for the end face of the terminal body 301 to abut on the wall part 351. However, in the present embodiment, since the terminal body 301 is apart from the insulating body 353 by the convex part 355, it is easy to bring the end face of the terminal body 301 close to or into contact with the wall part 351. That is, the upper insulating member 350 has the effectiveness as a detent for the electrode terminal 300. Further, since the R part 351a having a large radius of curvature can be provided at the root of the wall part 351, the strength of the wall part 351 can be improved, and this also contributes to the improvement in the effectiveness of the detent for the electrode terminal 300.

As described above, the energy storage device 10 according to the present embodiment is the energy storage device 10 including the upper insulating member 350 disposed between the terminal body 301 of the electrode terminal 300 and the case 100, as well as the energy storage device 10 having high reliability.

Although either the terminal body 301 or the upper insulating member 350 may have the convex part for separating the terminal body 301 from the upper insulating member 350 in the Z-axis direction, in the present embodiment, the convex part 355 is provided on the upper insulating member 350 as described above.

The upper insulating member 350 has the convex part 355, thereby preventing damage to the portions of the upper insulating member 350 except for the convex part 355, for example. Specifically, the electrode terminal 300 is made of metal, and its strength is larger than the strength of the upper insulating member 350 made of resin. Therefore, when the convex part is provided on the electrode terminal 300 and the terminal body 301 is pressed at the time of joining with the bus bar, or the like, the convex part made of metal is slid into the upper insulating member 350, and as a result, the upper insulating member 350 may have a problem such as a crack. In this regard, in the energy storage device 10 according to the present embodiment, since the upper insulating member 350 has the convex part 355, the convex part 355 made of resin absorbs the pressing force, thereby preventing damage to the portions of the upper insulating member 350 except for the convex part 355. The upper insulating member 350 is prepared by resin molding, so that it is easy to form the convex parts 355 in accordance with, for example, the size or shape of the electrode terminal 300.

In the energy storage device 10 according to the present embodiment, a plurality of convex parts 355 are disposed dispersedly when viewed from a predetermined direction (the extension direction of the shaft 310, the same shall apply hereinafter).

With this configuration, since the plurality of convex parts 355 for separating the terminal body 301 and the upper insulating member 350 are disposed dispersedly, the support of the terminal body 301 by the upper insulating member 350 can be stabilized. In the present embodiment, as illustrated in FIG. 4, the upper insulating member 350 is provided with a pair of convex parts 355 facing each other in the X-axis direction across the opening 352 and a pair of convex parts 355 facing each other in the Y-axis direction across the opening 352. Thus, the four convex parts 355 can support the plate-like terminal body 301 with good balance.

In the energy storage device 10 according to the present embodiment, the gap 320 formed on the side of the convex part 355 is formed in a region between the convex part 355 and the step 305 when viewed from a predetermined direction (cf. FIG. 6).

As described above, in the present embodiment, in the electrode terminal 300, since the convex part 355 for supporting the terminal body 301 is at a position apart from the step 305 which is a portion supported by the upper insulating member 350, the terminal body 301 is supported more stably. Since the existence range of the gap 320 when viewed from the predetermined direction is relatively wide, a bonding region (a region suitable for joining by laser welding or the like) in the terminal body 301 is relatively wide.

In the energy storage device 10 according to the present embodiment, for example, as illustrated in FIG. 6, the convex part 355 is provided integrally with the wall part 351. That is, the wall part 351 and the convex part 355 are formed continuously.

As described above, since the convex part 355 is integrated with the wall part 351, the wall part 351 functions as a location for reinforcing the convex part 355, so that the rigidity of the convex part 355 is improved as compared to when the convex part 355 is assumed to be apart from the wall part 351. Thereby, even when a relatively large pressing force is applied to the terminal body 301 at the time of joining the bus bar or the like, the possibility of crushing the convex part 355 is reduced. As a result, the formation of the gap 320 between the terminal body 301 and the upper insulating member 350 is ensured. When the convex part 355 is pressed, a part of the pressing force acts as a force in a direction to tilt the wall part 351 inward, whereby the wall part 351 approaches the end face of the terminal body 301 or the wall part 351 and the end face of the terminal body 301 come into close contact. As a result, for example, the function of the wall part 351 as a detent for the terminal body 301 is exhibited more reliably.

As illustrated in FIG. 6, the portion of the upper insulating member 350 on the backside of the terminal support part 354 is accommodated in a recess 111 provided in the lid plate 110 of the case 100. That is, the case 100 is provided with the recess 111 provided at a position corresponding to the step 305, and the recess 111 formed in a state where a part of the case 100 is swollen toward the inside of the case 100.

The recess 111 having such a shape can be formed in the lid plate 110 by half-punching, which is a kind of press working. The position corresponding to the step 305 in the case 100 is a portion to which a relatively large force is applied at the time of caulking the shaft 310 and at the time of welding the terminal body 301 and the bus bar. Since the recess 111 is formed in this part, the recess 111 functions as a location for reinforcing the lid plate 110, and deformation of the lid plate 110 is prevented at the time of caulking the shaft 310 and at the time of welding the terminal body 301 and the bus bar.

Although the energy storage device 10 according to the embodiment has been described above, the energy storage device 10 may include the upper insulating member 350 and the electrode terminal 300 in an aspect different from that illustrated in FIGS. 3 to 6. A modification of the upper insulating member 350 and the electrode terminal 300 in the energy storage device 10 will be described below with a focus on a difference from the above embodiment.

Modification

Figure 7:
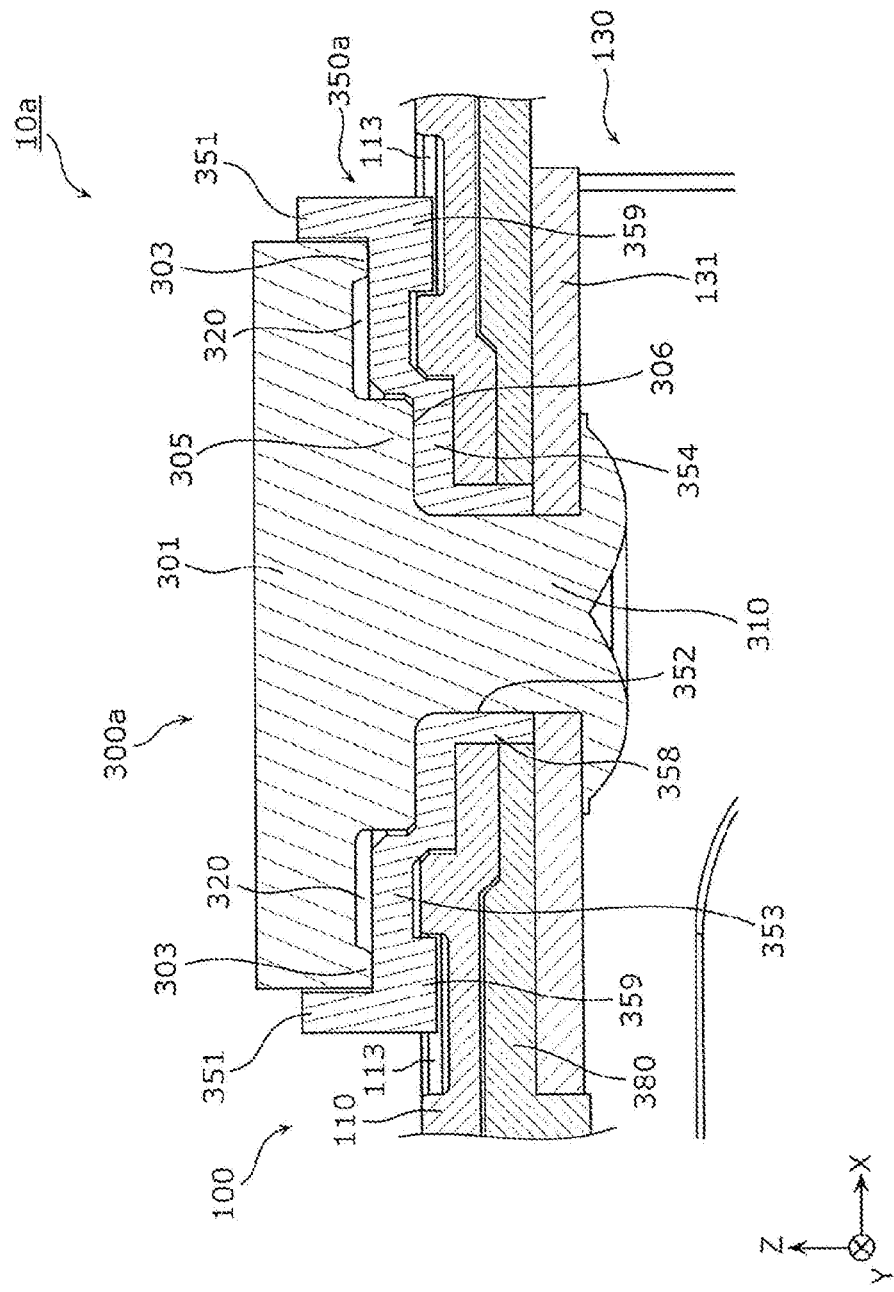
FIG. 7 is a partial cross-sectional view of an energy storage device according to a modification of the embodiment.

FIG. 7 is a partial cross-sectional view of an energy storage device 10a according to the modification of the embodiment. Specifically, FIG. 7 illustrates a partial cross-section of the energy storage device 10a at a position corresponding to FIG. 6.

The energy storage device 10a illustrated in FIG. 7 includes the case 100, an electrode terminal 300a, and an upper insulating member 350a. More specifically, the upper insulating member 350a is disposed between the terminal body 301 of the electrode terminal 300a and the lid plate 110 which is a part of the case 100, and the terminal bottom surface 306 of the step 305 is supported by the terminal support part 354 of the upper insulating member 350a. The gap 320 is formed between the terminal body 301 and the upper insulating member 350a on the side of a convex part 303.

That is, the energy storage device 10a has a structural feature that the gap 320 is formed on the side of the convex part 303 between the terminal body 301 and the upper insulating member 350a, and in this regard, the energy storage device 10a is common to the energy storage device 10 according to the embodiment. However, the energy storage device 10a according to the present modification differs from the energy storage device 10 according to the embodiment in that the convex part 303 forming the gap 320 between the terminal body 301 and the upper insulating member 350a is provided on the electrode terminal 300a.

In this instance, for example, as illustrated in FIG. 7, by disposing the convex part 303 at the end of the terminal body 301, the lateral surface of the convex part 303 forms a part of the end face of the terminal body 301. As a result, the contact area between the end face of the terminal body 301 and the wall part 351 of the upper insulating member 350a is relatively large, and thereby, for example, the effect of the upper insulating member 350a as a detent for the terminal body 301 is improved.

Even when the electrode terminal 300a has the convex part 303, for example, the convex part 303 and the upper insulating member 350a are brought into surface contact with each other, so that the convex part 303 is prevented from biting into the upper insulating member 350a when the terminal body 301 is pressed.

In FIG. 7, the convex part 303 is provided on the electrode terminal 300a as a part of the terminal body 301 made of metal. However, for example, the convex part 303 made of resin may be bonded or welded to the terminal body 301. For example, the convex part 303 made of resin may be provided on the terminal body 301 by insert molding.

Other Embodiments

The energy storage device according to the present invention has been described with reference to the embodiment and its modification. However, the present invention is not limited to the above embodiment and modification. Unless departing from the gist of the present invention, a form constructed by applying various modifications conceivable by a person skilled in the art to the above embodiment or modification, or by combining the plurality of components described above, is within the scope of the present invention.

For example, it is not essential that only either the electrode terminal 300 or the upper insulating member 350 has the convex part, but both the electrode terminal 300 and the upper insulating member 350 may have the convex part. That is, even when each of the electrode terminal 300 and the upper insulating member 350 has a convex part projecting toward the other, a gap can be formed between the electrode terminal 300 and the upper insulating member 350 on the side of the convex parts.

In the above embodiment, the upper insulating member 350 has four convex parts 355, but the number of convex parts 355 only need be one or more. The shape of the convex part 355 is not particularly limited, but various shapes such as a columnar shape or a prismatic shape can be adopted.

In the upper insulating member 350, the convex part 355 need not be integrated with the wall part 351. Even when the convex part 355 is disposed at a position away from the wall part 351, for example, by forming the convex part 355 into a frustum shape, even when a relatively large pressing force is applied to the terminal body 301 at the time of joining the bus bar or the like, the possibility of crushing the convex part 355 is reduced.

In the above embodiment, the projection 359 of the upper insulating member 350 is engaged with the engagement recess 113 provided in the lid plate 110, but the projection 359 may not be in contact with the inner surface of the engagement recess 113. That is, the projection 359 can serve as a detent for the upper insulating member 350 so long as being located inside the engagement recess 113. With the projection 359 being not in contact with the inner surface of the engagement recess 113, for example, the heat generated at the time of welding the lid plate 110 and the case body 101 is hardly transmitted from the lid plate 110 to the upper insulating member 350. This prevents damage to the upper insulating member 350 due to the heat during welding.

The upper insulating member 350 interposed between the terminal body 301 and the case 100 may be integrated with the lower insulating member 380. For example, the upper insulating member 350 and the lower insulating member 380 integrated with the lid plate 110 of the case 100 may be prepared by insert molding.

In the electrode terminal 300, the shaft 310 and the terminal body 301 may be separated. For example, the electrode terminal 300 may be formed by connecting the separately prepared terminal body 301 and shaft 310 by caulking, welding, or the like. Further, the shaft 310 may be connected to another member (e.g., current collector 130) at a point in time before being connected to the terminal body 301.

It is not essential that the convex part forming the gap between the terminal body and the upper insulating member be integral with either the terminal body or the upper insulating member. For example, a member separate from the terminal body and the upper insulating member may be sandwiched between the terminal body and the upper insulating member to function as a convex part forming a gap between the terminal body and the upper insulating member.

The supplementary matters related to the upper insulating member 350 and the electrode terminal 300 described above may be applied to the upper insulating member 350a and the electrode terminal 300a according to the above modification. A form constructed by any combination of the configurations described in the above embodiment and modification are also within the scope of the present invention.

The present invention can be realized not only as the energy storage device described above but also as an energy storage apparatus including a plurality of the energy storage devices.

INDUSTRIAL APPLICABILITY

The present invention is applicable to an energy storage device such as a lithium ion secondary battery.

DESCRIPTION OF REFERENCE SIGNS 10, 10a: energy storage device
100: case
200, 300, 300a: electrode terminal
250, 350, 350a: upper insulating member
301: terminal body
303, 355: convex part
305: step
306: terminal bottom surface
310: shaft
320: gap
351: wall part
354: terminal support part
380: lower insulating member

The invention claimed is:

1. An energy storage device comprising:
a case;
an electrode terminal including:
 a plate-shaped terminal body;
 a shaft extended in a predetermined direction from the terminal body; and
 a step disposed at a root of the shaft; and
an insulating member disposed between the terminal body and the case,
wherein the insulating member includes:
 a terminal support part abutting on a terminal bottom surface of the step, the terminal bottom surface being a surface in the predetermined direction;
 a wall part adjacent to an end face of the terminal body; and
 an insulating body adjacent to a side surface of the step in an intersecting direction that is perpendicular with the predetermined direction,
wherein the wall part is at an outer peripheral edge of the insulating body, and
wherein a convex part projecting upward from the insulating body toward the terminal body is formed at a position between the step and the wall part,
wherein a gap is formed between the terminal body and the insulating body of the insulating member on a side of the convex part when viewed from the predetermined direction,
wherein a top surface of the convex part is aligned with a surface of the terminal body that bounds an upper side of the gap,
wherein a portion of the terminal body that corresponds with the gap is apart from a portion of the insulating body corresponding with the gap by a thickness of the convex part in the predetermined direction, and
wherein the convex part is integrally and continuously provided with the wall part such that the wall part extends from the convex part in a direction away from the case and in the intersecting direction.

2. The energy storage device according to claim 1, further comprising a plurality of convex parts that includes the convex part as one of the plurality of convex parts,
wherein the plurality of convex parts are disposed dispersedly when viewed from the predetermined direction.

3. The energy storage device according to claim 1, wherein the gap is formed in a region between the convex part and the step when viewed from the predetermined direction.

4. The energy storage device according to claim 1, wherein the case is provided with a recess of the case provided at a position corresponding to the step.

5. The energy storage device according to claim 1, wherein the case includes a lid plate and a case body,
wherein the lid plate is provided with a recess of the lid plate disposed at a position corresponding to the step, the recess of the lid plate being provided at a position of the lid plate below the terminal support part of the insulating member.

6. The energy storage device according to claim 1, wherein the insulating member further includes:

an opening of the insulating member which the shaft is inserted into; and a recess of the insulating member surrounding the opening and having a size corresponding to the step.

7. The energy storage device according to claim 1, wherein a height of the gap in the predetermined direction between the terminal body and the insulating body of the insulating member corresponds to a height of the convex part in the predetermined direction.

8. The energy storage device according to claim 1, wherein an entirety of the gap is formed upward of the insulating body when viewed from the predetermined direction.

9. The energy storage device according to claim 1, wherein the gap is disposed adjacent to the convex part in the intersecting direction.

10. The energy storage device according to claim 1, wherein the wall part is erected upward above a surface of the terminal body that contacts the convex part.

11. The energy storage device according to claim 1, wherein the terminal bottom surface of the step is disposed above the terminal support part when viewed from the predetermined direction.

12. The energy storage device according to claim 1, wherein the gap is formed between the step and the convex part in the intersecting direction.

13. The energy storage device according to claim 1, wherein the wall part is disposed to cover a periphery of the terminal body when viewed in the intersecting direction.

14. The energy storage device according to claim 1, further comprising a second insulating member that is disposed such that the case is sandwiched between the insulating member and the second insulating member.

15. An energy storage device comprising:
a case;
an electrode terminal including:
 a plate-shaped terminal body;
 a shaft extended in a predetermined direction from the terminal body; and
 a step disposed at a root of the shaft; and
an insulating member disposed between the terminal body and the case,
wherein the insulating member includes:
 an opening of the insulating member which the shaft is inserted into;
 a recess of the insulating member surrounding the opening and having a size corresponding to the step;
 a terminal support part abutting on a terminal bottom surface of the step, the terminal bottom surface being a surface of the step in the predetermined direction;
 a wall part facing an end face of the terminal body; and
 an insulating body facing a side surface of the step in an intersecting direction that is perpendicular with the predetermined direction,
wherein the wall part is at an outer peripheral edge of the insulating body,
wherein on the insulating member, a convex part projecting toward the terminal body is formed at a position between the step and the wall part, wherein the convex part is adjacent to the wall part,
wherein a gap is formed between the terminal body and the insulating body in the predetermined direction,
wherein a size of the terminal support part in the intersecting direction corresponds to a size of the step in the intersecting direction,
wherein the insulating body is adjacent to the recess in the intersecting direction and is disposed outside of the recess, and
wherein the convex part is integrally and continuously provided with the wall part such that the wall part extends from the convex part in a direction away from the case and in the intersecting direction.

16. The energy storage device according to claim 15, wherein a top surface of the convex part is aligned with a surface of the terminal body that bounds an upper side of the gap.

17. The energy storage device according to claim 16, wherein a depth of the gap extends downward from a top surface of the convex part in the predetermined direction.

18. The energy storage device according to claim 15, wherein a depth of the gap extends downward from a top surface of the convex part in the predetermined direction.

19. An energy storage device comprising:
a case;
an electrode terminal including:
 a plate-shaped terminal body;
 a shaft extended in a predetermined direction from the terminal body; and
 a step disposed at a root of the shaft; and
an insulating member disposed between the terminal body and the case,
wherein the insulating member includes:
 a terminal support part abutting on a terminal bottom surface of the step, the terminal bottom surface being a surface in the predetermined direction;
 a wall part adjacent to an end face of the terminal body; and
 an insulating body adjacent to a side surface of the step in an intersecting direction that is perpendicular with the predetermined direction,
wherein the wall part is at an outer peripheral edge of the insulating body, and
wherein a convex part projecting upward from the insulating body toward the terminal body is formed at a position between the step and the wall part,
wherein a gap is formed between the terminal body and the insulating body of the insulating member on a side of the convex part when viewed from the predetermined direction,
wherein a surface of the insulating body opposing the terminal body is disposed in a different position from a surface of the terminal support part with respect to the predetermined direction, and
wherein the convex part is integrally and continuously provided with the wall part such that the wall part extends from the convex part in a direction away from the case and in the intersecting direction.

* * * * *